US010711178B2

(12) United States Patent
Chaalal

(10) Patent No.: US 10,711,178 B2
(45) Date of Patent: Jul. 14, 2020

(54) SECONDARY AND TERTIARY GREEN WATER FLOODING OF FRACTURED AND HETEROGENEOUS OIL RESERVOIRS AT HIGH SALINITY AND HIGH TEMPERATURE

(71) Applicant: Abu Dhabi University, Abu Dhabi (AE)

(72) Inventor: Omar Chaalal, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 41 days.

(21) Appl. No.: 15/342,664

(22) Filed: Nov. 3, 2016

(65) Prior Publication Data

US 2018/0119001 A1  May 3, 2018

(51) Int. Cl.
*C09K 8/584* (2006.01)

(52) U.S. Cl.
CPC .................... *C09K 8/584* (2013.01)

(58) Field of Classification Search
CPC ................ C09K 8/584; E21B 43/20
See application file for complete search history.

(56) References Cited

U.S. PATENT DOCUMENTS

| | | | |
|---|---|---|---|
| 2009/0104174 A1* | 4/2009 | Smith | A61K 8/44 424/94.63 |
| 2012/0157354 A1* | 6/2012 | Li | C09K 8/08 507/129 |

OTHER PUBLICATIONS

Shahri et al ,"Applicability Test of New Surfactant Produced from Zizyphus Spina-Christi Leaves for Enhanced oil Recovery in Carbonate Reservoirs", Journal of Japan Petroleum Institute, 55, (1), 27-32 (2012).*
https://en.wikipedia.org/wiki/Ziziphus: "Ziziphus", Wikidepia, retrieved from the Internet Jan. 25, 2019.*
Benyamin Yadali Jamaloei, "Insight into the Chemistry of Surfactant-Based Enhanced Oil Recovery" Recent Patents on Chemical Engineering, 2009, vol. 2, Issue 1, 10 pages.
R. L. Reed, and R. N. Healy, "Improved Oil Recovery by Surfactant and Polymer Flooding", edited by D. O. Shah and R. S. Schechter, Academic Press, Inc., New York, New York, 1977.
Hirasaki G. J., Miller C. A., & Puerto M. "Recent Advances in Surfactant Eor.", SPE Journal, vol. 16, Issue 4, 2011: 889-907, 20 pages.
M. Pordel Shahri, S. R. Shadizadeh and M. Jamialahmadi "Applicability Test of New Surfactant Produced from Zizyphus Spina-Christi Leaves for Enhanced Oil Recovery in Carbonated Reservoir", Journal of Japan Petroleum Institute, vol. 55, Issue 1, 2012, pp. 27-32, 6 pages.

* cited by examiner

Primary Examiner — Frances Tischler

(57) ABSTRACT

A composition and a method to improve the exploit of oil from a hydrocarbon containing formation are disclosed. The method is characterized in that a aqueous composition including extract of a plant is injected into the formation to reduce the interfacial tension between the oil trapped in the formation and water, and the oil in said aqueous mixture is recovered for further use. Preferably, the aqueous mixture injected comprises an interfacial tension reducing composition made from a plant extract based on a plant family to which the plants Ziziphus Spina Christi and Aloe Vera belong. In particular the injection mixture also comprises at least one of the following constituents: fructose, sucrose, maltose, proteins, lipids and saponins.

9 Claims, 1 Drawing Sheet

SECONDARY AND TERTIARY GREEN WATER FLOODING OF FRACTURED AND HETEROGENEOUS OIL RESERVOIRS AT HIGH SALINITY AND HIGH TEMPERATURE

FIELD OF THE INVENTION

The present invention relates to a novel method and composition for enhancing oil recovery from a reservoir. More particularly, the present invention relates to a composition comprising Ziziphus Spina Christi and Aloe Vera and to a method for an efficient oil recovery using said composition, in particular for secondary and tertiary water flooding of high-temperature and high-salinity heterogeneous oil reservoirs.

BACKGROUND OF THE INVENTION

Oil recovery refers to the process by which crude oil is extracted from beneath the Earth's surface. Oil recovery can be divided into three phases: Primary, Secondary and Tertiary. The primary phase production uses the reservoir's natural energy (fluid and rock expansion, solution-gas drive, gravity drainage, and aquifer influx) to produce oil. This phase allows about 5% to 10% of the oil in the reservoir to be extracted.

In the secondary phase production, also named as "secondary recovery", a water-flooding process uses water injection to increase the production from the oil reservoir. Secondary recovery allows an additional 25% to 30% of the extracted oil from the reservoir. However, even after a long term water-flooding process, some amounts of oil still remain trapped in the reservoir due to a high capillary pressure.

The aim of the tertiary phase recovery of oil is to recover crude oil remaining after the primary and secondary oil recovery. In this phase different materials are injected together with water to improve the flow between oil, gas and rock. In this phase, an additional 20% to 30% of the oil in the reservoir can be extracted.

It is known that the interfacial tension (IFT) between crude oil and water should be significantly very low for a successful enhanced oil recovery. This can be achieved using surfactant flooding. Generally, the main requirement of surfactant processes is targeting of ultralow interfacial tensions. For this purpose, the right surfactant should be selected and evaluated at low and economic concentrations. On the other hand, maintaining low interfacial tension during the displacement process is a critical challenge because of dilution and adsorption effects in the reservoir.

The presently known technologies suggest the use of various materials and processes such as $CO_2$ injection, surfactant agent injection, natural gas miscible injection, and steam recovery, in particular, during the tertiary oil recovery phase. In this phase the injection of different materials improves the flow between oil, gas and rock, and to recover crude oil still remaining after the primary and secondary oil recovery phases. Oil that is left behind after water flooding is still present because either it has not been contacted by the injected fluid, or because of the presence of the capillary forces that exist between oil, water and the porous rock in the contacted portions which trap and retain said oil.

It is known in the state of the art the use of surfactant agents that are introduced into the reservoir to increase oil recovery by lowering the interfacial tension between oil and water. Trapped oil droplets are mobilized due to a reduction in interfacial tension between oil and water. The coalescence of these drops leads to a local increase in oil saturation. An oil bank starts to flow, mobilizing any residual oil in front. Eventually, the ultimate residual oil is determined by interfacial tension between the oil and surfactant solution behind the oil collection.

Nowadays, methods for improving oil recovery, in particular those concerned with lowering the interstitial oil saturation, have received a great interest in the industry. There are many different types of chemical compositions used in the oil recovery process involving the individual or combined injection of surfactants that lower the surface interfacial tension between the injected water and crude oil in the reservoir and/or change the wettability of the reservoir rock surface, allowing the desorption of crude oil. During the past several decades, various methods have been sought in order to efficiently increase the secondary and tertiary oil recovery process, while improving the economic viability and efficiency of operations. Examples of said methods include, but are not limited to, chemicals, polymer, surfactant and alkaline flooding techniques. Although said methods have been shown to be responsible in decreasing the interfacial tension while increasing the sweep efficiency, there is still a need for enhanced oil recovery from the reservoirs, in particular where such oil recovery process should be carried out from high salinity and high temperature of oil reservoirs. Most of the available surfactants used in oil recovery operations are either ineffective at a high level of salinity hardness of the water, or incapable to stand the higher temperatures of many processes.

Therefore there is a need to provide a method for an efficient secondary and tertiary water flooding of heterogeneous oil reservoirs at high salinity and high temperature. In particular there is a need to provide a novel composition able to improve oil recovery from reservoirs by efficiently reducing interfacial tension while increasing the volumetric sweep efficiency of fractured and/or heterogeneous oil reservoirs.

SUMMARY OF THE INVENTION

Therefore it is an object of the present invention to provide a novel method and composition for enhancing oil recovery from an oil reservoir. The composition is introduced into the reservoir to increase oil recovery by lowering the interfacial tension between oil and water. More particularly, the object of the present invention is to provide a novel natural surfactant composition from plant extracts to increase oil recovery by lowering the interfacial tension between oil and water.

As a first aspect of the present invention, there is provided an aqueous composition comprising a mixture of an aqueous extract of Ziziphus Spina Christi plant and an aqueous extract of Aloe Vera plant, wherein the Ziziphus Spina Christi and the Aloe Vera are present in said mixture at a ratio of 80% by volume of Ziziphus Spina Christi and 20% by volume of Aloe Vera.

In a preferred embodiment, the composition of the present invention further comprises at least one of fructose, Sucrose, Maltose, Proteins, Lipids and Saponins.

In another preferred embodiment, the aqueous composition has a pH value equal to 6.0.

In another preferred embodiment, both Ziziphus Spina Christi and aloe Vera extracts are separately prepared by dissolving 1 g of the leaves of each ingredient per 100 mL of water, wherein said water having a concentration of salt ranging from zero parts per million to 171600 parts per million.

In another aspect of the present invention, there is provided the use of the composition of the present invention for enhancing oil recovery from natural oil reservoir, preferably, for secondary and tertiary water flooding of oil reservoirs, even more preferably, wherein the oil reservoir is a high-salinity and high-temperature fractured and heterogeneous oil reservoir.

In another preferred embodiment, there is provided a method for removing oil from an oil reservoir, the method comprising injecting the aqueous composition of the present invention into the oil reservoir core, where the oil is flooded out, wherein in particular, the oil droplets entrapped in the reservoir core are extracted by the flooding injected composition of the present invention.

In another preferred embodiment, the method of the present invention comprises lowering the interfacial tension between oil and water by injecting the aqueous composition of the present invention into an oil reservoir.

In a preferred embodiment of the present invention, there is provided a method to exploit oil from an hydrocarbon containing formation, characterized in that a watery composition including extract of a plant is injected into the formation to reduce the interfacial tension between the oil trapped in the formation and water, and the oil in said watery mixture is recovered for further use.

Preferably, a mixture is injected comprising an interfacial tension reducing composition made from a plant extract based on a plant family to which the plants Zizyphus Spina Christi and Aloe Vera belong.

Preferably, the injection mixture comprises at least one of the following constituents: Fructose, Sucrose, Maltose, Proteins, Lipids and Saponins.

Preferably, use is made of an injection mixture of said plant leaves dissolved in water with a concentration of salt from zero ppm up to 171600 ppm (ppm=parts per million).

Preferably, use is made of an injection mixture made up of 80% Zizyphus Spina Christi extract and 20% of Aloe Vera extract.

Preferably, the pH of Aloe Vera extract and the pH of Zizyphus Spina Christi extract are balanced to give the mixture of Zizyphus Spina Christ and Aloe Vera (GAZSC-AGOV) in a ratio of 80:20 a pH value that matches with the original pH of the injecting water that is used in the flooding process in the hydrocarbon containing field. GAZSC is the name given to the extract from Zizyphus Spina Christi. In the term GAZSC, the G stands for green, the A stands for agent and the ZSC stands for Zizyphus Spina Christi. In the term AGOV, A stands for agent, G stands for green, and OV is for Aloe Vera.

Preferably, the watery product is added into a saline (brine) water that is injected in a well in the formation to effect said flooding so that the tiny oil droplets entrapped in the formation agglomerate to larger oil droplets or oil films shapes and are extracted by the flooding mixture of the invention to be directed upwards to the surface through a well.

Preferably, the method applying the interfacial tension reducing composition is used in secondary and tertiary water flooding of fractured and heterogeneous oil reservoirs at high salinity and high temperature.

Preferably, the flooding process is characterized such that the watery interfacial tension reducing composition comprises at least one of the following constituents: Fructose, Sucrose, Maltose, Proteins, Lipids and Saponins.

Preferably, the interfacial tension reducing composition comprises an extract of a plant sort to which the plants Zizyphus Spina Christi and Aloe Vera belong.

Preferably, the interfacial tension reducing composition mixture comprise said plant leaves dissolved in water with a concentration of salt from zero ppm up to 171600 ppm (ppm=parts per million).

Preferably, the GAZSC-AGOV (80:20) mixture is 100% natural, safe and environmentally friendly and recovers more than 96% of the oil trapped in any oil reservoir.

Preferably, the GAZSC-AGOV (80:20) mixture is effective at high salinity (up to 172000 ppm) and a temperature over than 90° C.

Preferably, the GAZSC-AGOV (80:20) mixture is effective with bivalent ions (14000 ppm for $Ca^{+2}$ and 3000 ppm for $Mg^{+2}$).

Preferably, the GAZSC-AGOV (80:20) mixture is effective with monovalent ions (57600 ppm for $Na^+$ and 122000 ppm for $Cl^-$).

Preferably, the pH of AGOV and pH of GAZSC are balanced to give the mixture of GAZSC-AGOV (80:20) a pH that matches with the original pH of the injecting water that is used in the secondary flooding and this characteristic allows the GAZSC-AGOV (80:20) mixture to be used in both secondary and tertiary flooding.

In another preferred embodiment, the method is used for secondary and tertiary water flooding of oil reservoir, in particular wherein the oil reservoir is a high-salinity and high-temperature fractured and heterogeneous oil reservoir.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
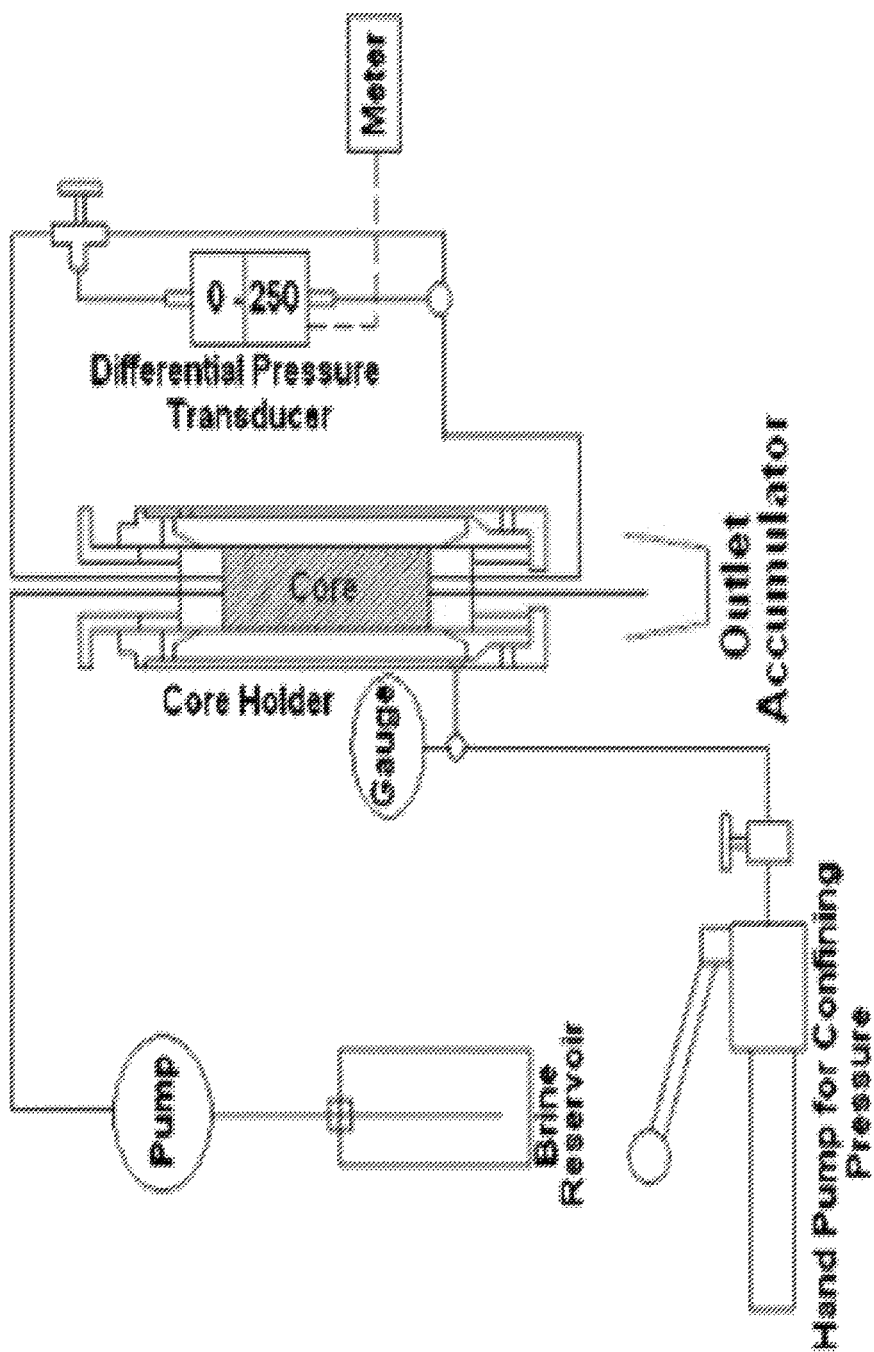
FIG. 1 illustrates the schematic diagram showing the arrangement of core in the flooding experiment.

The invention introduces a novel composition, based on natural products, which is able to enhance oil reservoir recovery operation through the reduction of interfacial tension while improving the volumetric sweep efficiency of fractured and/or heterogeneous oil reservoirs. The novel composition is an aqueous composition extracted from two plants. The first plant is the Ziziphus Spina Christi, and the second plant is Aloe Vera. These two plants are known in the art and are present elsewhere, in particular Ziziphus Spina Christi plant can be easily found in the Middle East region.

It has been found that the new injective composition comprising Ziziphus Spina Christi extract and Aloe Vera extract has shown to be very effective in formation water whose salinity is in range of 70000 to 180000 ppm (parts per million) of dissolved solids and also having temperatures as high as 90° C. The composition of the present invention is mixed with water and is stable over a wide range of formation temperatures and water salinities and hardness values. In addition the new composition, based on green natural products, is environmentally friendly, non-toxic, easy and safe to handle. Most remarkably the new composition shows an oil recovery of 96.5% at reservoir temperature. This recovery percentage is a breakthrough in the field of enhanced oil recovery.

Ziziphus Spina Christi and Aloe Vera plants comprise various chemical components such as amino acids, anthraquinones, enzymes, minerals, vitamins, lignins, monosaccharide, polysaccharides, salicylic acid, saponins, and sterols. The main enzymes found in Aloe Vera include Amylase, Bradykinase, Catalase Cellulase, Lipase, Oxidase, Alkaline Phosphatase, Proteolytiase, Creatine Phosphokinase and Carboxypeptidase. The minerals contained in Aloe Vera include Copper, Iron, Potassium, Phosphorus and Sodium.

All these carbohydrates, proteins and enzymes contained in the two plants are introduced as an additive to improve water-flood performance by affecting interactions at the oil-water-rock interfaces. Oil entrapment is a result of complex interactions between viscous, gravity and capillary forces. The enzymes facilitate the movement of oil in the pores of the rock and improve recovery from oil fields by cleaning the rock.

Ziziphus Spina Christi and Aloe Vera are first extracted with water and then mixed at a proportion of 80% by volume of Ziziphus Spina Christi and 20% by volume of Aloe Vera. It has been shown by interfacial tension experiments that this proportion is the most efficient mixture to be used as a surfactant for an efficient oil recovery operation.

Interfacial Tension (IFT) Experiments

Ziziphus Spina Christi extract was prepared by dissolving 1 g of the plant leaves in 100 ml of water containing variable concentrations of salts varying from zero ppm to 171600 ppm. Similarly, Aloe Vera extract was prepared by dissolving 1 g of the young leaves in 100 ml of water containing variable concentrations of salt varying from zero ppm to 171600 ppm. The water used is synthetic water prepared by adding sodium chloride in order to get variable concentrations of salts varying from zero ppm to 171600 ppm to simulate the formation water. The extracts were filtrated, kept in sealed bottles and stocked in refrigerated conditions.

The interfacial tension at various salt concentrations of the water was examined for each extract composition. Furthermore, the two extracts were mixed in different volume proportion in order to find the best mixture that gives the lowest interfacial tension and the highest oil recovery.

It has been found that the mixture comprising 80% by volume of Ziziphus Spina Christi extract and 20% by volume of Aloe Vera extract enable lowering the interfacial tension of the oil significantly. It is believed that the organic compounds, such as, sugars, proteins and saponin, are responsible for the reduction of interfacial tension, creating emulation and high oil recovery. The total content of the organic compounds in the mixture is presented in Table 1.

TABLE 1

Organic compounds in the mixture

| Compounds | Concentrations (mg/l) |
| --- | --- |
| Fructose | 563.10 |
| Sucrose | 179.50 |
| Maltose | 183.61 |
| Total sugars | 926.21 |
| Proteins | 281 |
| Lipids | 6 |
| Saponin | 13.6 (mg/g) |

The lipid content of the composition mixture of the present invention is about 0.6% by weight. Within this small amount of lipid content it was not possible to calculate the exact amount of cholesterol and vitamins contained in said composition mixture. The proteins and saponin content of the composition mixture of the present invention is 2.81% by weight and 13.6 mg/g, respectively.

Oil-in-water emulsions are important in the petroleum industry as a displacing fluid for enhanced oil recovery. The presence of proteins in the mixture enhances the emulsion properties of said mixture. It is known that protein and oil are two key ingredients for any emulsion. Oil dispersions in the form of small spherical droplets are stabilized in the aqueous phase by protein in an oil-in-water (O/W) emulsion. The surface-active protein is adsorbed at the interface between oil and the aqueous phase to lower surface tension and prevent oil droplets from coming close enough together to aggregate. Proteins, being surface active, can play a major role in the formation and stabilization of emulsions in the presence of polysaccharide, while interacting through electrostatic or hydrophobic-hydrophobic interactions. Bio-emulsifiers are (lipo) polysaccharides or (lipo) proteins combination of these. The mixture is acting as bio-emulsifiers; bio-emulsifiers are known to bind highly to the oil water interfacial and stabilize the emulsion. The increased oil recovery obtained by using the crude bio-emulsifier can be attributed to its combined surface and emulsification activity. Its mechanism of oil recovery must be similar to the mechanism exhibited by surfactant-polymer flooding process of chemical enhanced oil recovery.

It is known that saponin dissolved into the injected water induces wettability alteration of the reservoir rock by changing the wettability of the rock toward a more water-wet state, which enable saponin to be used as a surface-active agent for enhanced oil recovery.

Results of interfacial tension investigations at various concentrations are presented in the Tables below.

Table 2 below represents the composition of Um Rudhuma brine water.

TABLE 2

Um Radhuma Brine Composition

| Wt. of 50 cc Brine: | 57510 | | Specific Gravity: | 1.1502 | 0 |
| --- | --- | --- | --- | --- | --- |
| Weighing Scale ID: | | | Calibration Date: | | |
| | | | Calibration Due Date: | | |

| CATIONS ANALYSED (mg/L) | | | ANIONS ANALYSED (mg/L) | |
| --- | --- | --- | --- | --- |
| Na+ | 57613 | Injecting brine BU-303 | Cl− | 122023 |
| Ca++ | 14033 | | SO4− | 420 |
| Mg++ | 3024 | | HCO3− | 244 |
| K+ | | | CO3− | |
| Ba++ | | | OH3− | |
| Fe++ | | | I− | |
| Sr++ | | | | |
| Li+ | | | | |

TABLE 2-continued

| | | Um Radhuma Brine Composition | | | | | |
|---|---|---|---|---|---|---|---|
| CHEMICALS | 1 LITRE mg | 1 LITRE gm | 5 LITRE gm | CHEMICALS | 1 LITRE mg | 1 LITRE gm | 5 LITRE gm |
| NaHCO3 (Anhy) | 335.94 | 0.34 | 1.68 | MgCl2•6H2O | 25294.55 | 25.29 | 126.47 |
| Na2CO3 (Anhy) | 0.00 | 0.00 | 0.00 | KCl | 0.00 | 0.00 | 0.00 |
| Na2SO4 (Anhy) | 621.05 | 0.62 | 3.11 | SrCl2•6H2O | 0.00 | 0.00 | 0.00 |
| NaCl | 145713.21 | 145.71 | 728.57 | LiCl | 0.00 | 0.00 | 0.00 |
| CaCl2 (Anhydrous) | 38858.78 | 38.86 | 194.29 | BaCl2•2H2O | 0.00 | 0.00 | 0.00 |
| CaCl2 2 H2O | 51474.45 | 51.47 | 257.37 | CaCl2•2H2O | 76704.38 | 76.70 | 383.52 |

Table 3 below displays the values of IFT for different salinities. GAZSC is the name given to the extract from Zizyphus Spina Christi. In the term GAZSC, the G stands for green, the A stands for agent and the ZSC stands for Zizyphus Spina Christi. In the term AGOV, A stands for agent, G stands for green, and OV is for Aloe Vera.

TABLE 3

The Effect of salinity on IFT

| GAZSC 1% | | AGOV 1% | |
|---|---|---|---|
| Salinity (ppm) | IFT (mN/m) | Salinity (ppm) | IFT (mN/m) |
| 25000 | 11.00 | 25000 | 2.97 |
| 43000 | 10.33 | 43000 | 2.33 |
| 86000 | 9.36 | 86000 | 2.33 |
| 172000 | 9.29 | 172000 | 2.35 |

The salinity in the table are shown in parts per million (ppm). This salinity is the salinity of a real injecting brine well (said Um Rudhuma well located in the Emirate of Abu Dhabi).

Table 4 below represents all the mixtures studied in this invention. From Table 3, said mixture of GAZSC-AGOV in an 80:20 ratio and salinity of 172000 ppm is selected. This particular mixture has the lowest IFT of 7.99 mN/m at temperature of 21.30° C.

TABLE 4

Results summary
Summary of the IFT experimental Results

| Water identification | Temperature (° C.) | Tension (mN/m) |
|---|---|---|
| GAZSC | 21.85 | 17.12 |
| AGOV | 21.85 | 9.35 |
| GAZSC_172000_ppm | 20.48 | 9.10 |
| GAZSC_86000_ppm | 20.75 | 9.61 |
| GAZSC_43000_ppm | 21.05 | 10.85 |
| AGOVE_172000_ppm | 19.05 | 3.35 |
| AGOVE_86000_ppm | 19.93 | 3.11 |
| AGOVE_43000_ppm | 20.20 | 4.66 |
| AGOVE_21500_ppm | 20.20 | 3.09 |
| GAZSC_1%-AGOVE_20-80 | 21.85 | 10.48 |
| GAZSC_1%-AGOVE_40-60 | 21.85 | 10.61 |
| GAZSC_1%-AGOVE_60-40 | 21.85 | 10.65 |
| GAZSC_1%-AGOVE_80-20 | 21.85 | 8.80 |
| GAZSC_2%-AGOVE_20-80 | 21.85 | 9.33 |
| GAZSC_2%-AGOVE_40-60 | 22.13 | 9.69 |
| GAZSC_2%-AGOVE_60-40 | 21.85 | 10.95 |
| GAZSC_2%-AGOVE_80-20 | 21.85 | 10.80 |
| GAZSC_1%-AGOVE_80-20_AGOVE_17200 | 21.30 | 7.99 |
| GAZSC_1%-AGOVE_80-20_AGOVE_86000 | 21.58 | 8.38 |
| GAZSC_1%-AGOVE_80-20_AGOVE_43000 | 21.58 | 11.06 |
| GAZSC_1%-AGOVE_80-20_AGOVE_21500 | 21.58 | 8.43 |

In the above table 1% GAZSC or 1% AGOV means 1% by weight where 1 gram of the plant in 100 ml of water. Similarly, 2% GAZSC means 2% by weight where 2 gram of the plant in 100 ml of water.

pH Measurements

The pH measurements were performed for the two extracts and the mixture composition when added to Um Rudhuma injecting water. The pH measurement is a very important parameter in the oil recovery process and hence pH measurements were performed. The result was as shown Table 5

TABLE 5

| pH values | |
|---|---|
| Composition | pH |
| Um Rudhuma water before injection | 6.22 |
| Um Rudhuma after injection | 6.22 |
| GAZSC | 6.8 |
| AGOV | 4.60 |
| 80:20 ratio of GAZSC-AGOV mixture | 6.0 |

The pH of Um Rudhuma was unchanged (6.22) after injection of the GAZSC-AGOV mixture. The GAZSC has a pH of 6.8 and AGOV has a pH of 4.6. The pH of 80:20 ratio GAZSC-AGOV mixture has a pH of 6.

Foam Experiment

It is known that the surface activity of foam reduces oil-water interfacial tension and facilitates wetting of oil-wet surfaces. Furthermore, foam has a beneficial effect for oil displacement. Hence, foam has the potential to increase oil recovery by improving a real sweep.

Shaking the green solution for few seconds produced a significant amount of foam. A testing tube containing 20 ml of the green water produced more than 30 ml of foam above the solution. The foam was stable for more than 24 hours at room temperature and was present at reservoir temperature of 90° C.

Flooding Experiments

Four cores were prepared to perform the flooding. Abu Hassa oil sample and Um Rudhuma brine sample, supplied by The Abu Dhabi Company for Onshore Petroleum Operations Ltd (ADCO), were used in the experiments. The cores were placed in the core holder as shown in FIG. 1.

The steps to perform Core Flooding test with Green Water are as follows:
1. Core drilling, trimming, cleaning and drying.
2. Measurement of porosity and permeability to gas.
3. Preparation of synthetic brine water.
4. Core saturation with brine.
5. Measurement of porosity and permeability to liquid.
6. Core flooding with crude oil to initial water saturation (Swi).
7. Aging of sample in crude for 3 weeks.
8. Core flooding with crude oil after aging to obtain the new (Swi).

9. Core flooding with brine to residual oil saturation (Sor).
10. Core flooding with Green Water to enhance oil recovery and produce the left over oil and obtain the new (Sor).
11. Cleaning the sample in Dean-Stark extractor for back calculations.

A hydrostatic core holder was used to run the core flooding test and enhanced oil recovery by Green Water Flooding. The steps for loading the core are as follows:
1. Insert core sample into the rubber sleeve.
2. Insert the flooding head into the sleeve (it must touch the upper end face of the sample).
3. Insert the end stem into the end stem (must touch the lower end the core).
4. Insert the whole assembly in the core holder.
5. Fasten the core holder cap and tightly.
6. Apply overburden pressure.
7. Connect flooding line, and back pressure valve.
8. Start flooding.

Experiment 1: Green Water Secondary Flooding at 90° C. and 86000 ppm Salinity

The core is flooded with saline water containing 86000 ppm total dissolved salts at a reservoir temperature of 90° C.

A is the cross section of the area of the core open to flow=11.646 cm$^2$
L is the length of the core=8.223 cm
The Bulk Volume BV is calculated by multiplying A and L $$BV = A \times L$$

$$BV = 11.646 \times 8.223 = 95.767 \text{ cm}^3$$

The pore volume PV is defined as volume of the water inside the core. The pore volume is calculated following the equation below:

PV=(weight of the core saturated with water−weight of the core when core is dry)/density of the water $$PV = (225.65 - 205.55) / 1.1155 = 18.019 \text{ cm}^3.$$

The porosity $\Phi$ is therefore defined as a percentage of the pore volume with respect to the bulk volume of the core. The percentage porosity $\Phi$ is calculated as follows:

$$\Phi = (PV/BV) \times 100 = (18.019/95.767) \times 100 = 18.82\%$$

The core that was saturated with water is then flooded with oil. The volume of water inside the core is 18.019 cm$^3$. After flooding the oil, the volume of water displaced was 11.90 cm$^3$.

The recovery water or remaining oil in the core is: 18.019 cm$^3$−11.90 cm$^3$=6.119 cm$^3$.

The % of the pore volume (Soi), also called as the initial water saturation is calculated according to the following equation:

$$Soi = (\text{water displaced}/PV) \times 100$$

$$Soi = (11.90/18.019) \times 100 = 66\%$$

The percent residual oil at saturation (Swi):

$$Swi = (\text{recovery water}/PV) \times 100\%$$

$$Swi = (6.119/18.019) \times 100\% = 33.96\%.$$

Green Water Flooding

When the core is flooded with the green water the volume of the oil that comes out was 9.20 cm$^3$. Therefore recovery water or oil remaining in the core after flooding with green water is:

11.90 cm$^3$−9.20 cm$^3$=2.70 cm$^3$.

The percent residual oil at saturation Sor is:

$$Sor = (2.70/11.90) \times 100\% = 22.69\%$$

The recovery factor: RF=1−0.2269=0.774.
The results of this experiment in the following Sheet 1.

Sheet 1: Green water secondary flooding at reservoir temperature 90 C. and salinity 86000 ppm

| Brine concentration, ppm: | 86000 ppm |
| Brine specific Gravity, gm/cc: | 1.1155 |

| SAMPLE NO | L cm | D cm | DRY WT gm | SAT WT gm | Kw md | A cm2 | BV cc | PV cc | f (%) |
|---|---|---|---|---|---|---|---|---|---|
| 46A | 8.223 | 3.850 | 205.55 | 225.65 | | 11.646 | 95.767 | 18.019 | 18.82 |
| Oil flood | | Wt. before test, gm | | 225.65 | | | | | |
| | | Wt after test, gm | | | | | | | |
| | | Volume of water out, cc | | 11.90 | | | | | |
| | | Swi, % pv | | 33.96 | | | | | |
| Green water flood | | Volume of oil out, cc | | 9.20 | | | | | |
| | | Volume of oil in place, cc | | 2.70 | | | | | |
| | | Sor, % | | 22.69 | | | | | |

| | Press. (psi) | Vol. (cc) | Time (sec) | Viscosity (cp) | K (md) | Average (md) |
|---|---|---|---|---|---|---|
| Ko@Swi | 350 | 2.00 | 60 | 4.10 | 4.05 | 4.05 |
| | 350 | 2.00 | 60 | 4.10 | 4.05 | |

| Green water flood | Press. (psi) | Vol. (cc) | Time (sec) | Viscosity (cp) | K (md) | Average (md) |
|---|---|---|---|---|---|---|
| Kw@Sor | 440 | 1.00 | 60 | 1.08 | 0.42 | 0.42 |
| | 440 | 1.00 | 60 | 1.08 | 0.42 | |

This experiment shows the effect of the green water on the oil recovery. Generally, formation water is injected in the secondary phase however, in this experiment; green water of salinity 86000 ppm was injected instead of regular formation water. The results show that when the green water is injected at salinity 86000 ppm (total dissolved salts) and at a reservoir temperature of 90° C., the oil recovery was 77.3%.

Experiment 2: Tertiary Flooding

In this experiment, a new core is used. The core is flooded with saline water containing 86000 ppm total dissolved salts at reservoir temperature 90° C.

A is the cross section of the area of the core open to flow=11.634 cm$^2$

L is the length of the core=7.157 cm

The Bulk Volume BV is calculated by multiplying A and L $$BV = A \times L$$

$$BV = 11.634 \times 7.157 = 83.266 \text{ cm}^3$$

The pore volume PV is defined as volume of the water inside the core. The pore volume is calculated following the equation below:

PV=(weight of the core saturated with water−weight of the core when core is dry)/(density of the water)

$$PV = (203.00 - 190.48)/1.1155 = 11.224 \text{ cm}^3.$$

The porosity Φ is therefore defined as a percentage of the pore volume with respect to the bulk volume of the core. The percentage porosity Φ is calculated as follows:

$$\Phi = (PV/BV) \times 100$$

$$(11.224/83.266) \times 100 = 13.48\%$$

The core that was saturated with water is then flooded with oil. The volume of water inside the core is 11.224 cm$^3$. After flooding the oil, the volume of water displaced was 6.20 cm$^3$.

The recovery water or remaining oil in the core is: 11.224 cm$^3$ − 6.20 cm$^3$ = 5.024 cm$^3$.

The % of the pore volume (Soi), also called as the initial water saturation is calculated according to the following equation:

$$Soi = (\text{water displaced}/PV) \times 100$$

$$Soi = (5.024/11.224) \times 100 = 44.76\%$$

The percent residual oil at saturation (Swi):

$$Swi = (\text{recovery water}/PV) \times 100\%$$

$$Swi = (6.20/11.224) \times 100\% = 55.24\%.$$

Secondary flooding with Um Rudhuma water alone. The volume of oil out was 3.10 cm$^3$. The volume of oil in place is 6.20 − 3.10 = 3.110 cm$^3$.

The percentage of residual oil is then (3.10/6.20)*100% = 50%

Tertiary flooding with Urn Rudhuma green water containing 86000 ppm salinity (total dissolved salts).

The flooding was at reservoir temperature 90° C.

The oil coming out after flooding with green water is 1.10 cm$^3$.

The volume of oil in place is 3.10 − 1.10 = 2 cm$^3$.

The percent of residual Oil is then (2/6.20)*100% = 32.26%.

The recovery factor RF is 1 − 0.32 = 0.68.

The results of this experiment are summarized in Sheet No. 2.

Sheet 2: Green water tertiary flooding at reservoir temperature 90 C. and salinity 86000 ppm

| Brim concentration, ppm: | 86000 ppm |
| Britx specific Gravity, gm/cc: | 1.1155 |

| SAMPLE NO | L cm | D cm | DRY WT gm | SAT WT gm | Kw md | A cm2 | BV cc | PV cc | f (%) |
|---|---|---|---|---|---|---|---|---|---|
| 47 | 7.157 | 3.848 | 190.48 | 203.00 | 14.700 | 11.634 | 83.266 | 11.224 | 13.48 |
| Oil flood | | Wt. before test, gm | | 203.00 | URD flood | | Volume of oil out, cc | | 3.10 |
| | | Wt. after test, gm | | | | | Volume of oil in place, cc | | 3.10 |
| | | Volume of water out, cc | | 6.20 | | | Sor, % | | 50.00 |
| | | Swi, % pv | | 44.76 | | | | | |
| Green water flood | | Volume of oil out, cc | | 1.10 | | | | | |
| | | Volume of oil in place, cc | | 2.00 | | | | | |
| | | Sor, % | | 32.26 | | | | | |

| | Press. (psi) | Vol. (cc) | Time (sec) | Viscosity (cp) | K (md) | Average (md) |
|---|---|---|---|---|---|---|
| Ko@Swi | 350 | 2.10 | 400 | 4.10 | 0.56 | 0.56 |
| | 350 | 2.10 | 400 | 4.10 | 0.56 | |

| URD flooding | Press. (psi) | Vol. (cc) | Time (sec) | Viscosity (cp) | K (md) | Average (md) |
|---|---|---|---|---|---|---|
| Kw@Sor | 400 | 0.70 | 60 | 1.62 | 0.43 | 0.43 |
| | 400 | 0.70 | 60 | 1.62 | 0.43 | |

| Green water flood | Press. (psi) | Vol. (cc) | Time (sec) | Viscosity (cp) | K (md) | Average (md) |
|---|---|---|---|---|---|---|
| Kw@Sor | 500 | 0.42 | 60 | 1.08 | 0.14 | 0.18 |
| | 500 | 0.42 | 60 | 1.80 | 0.23 | |

When Um Rudhuma water is injected in the secondary phase, the oil recovery is 50%. However, in the previous experiment when Um Rudhuma was combined with the green product and injected in the secondary phase, the oil recovery was much higher at 77.4%. This shows that green water upgraded the oil recovery.

Experiment 3: The Effect of Salinity on Oil Recovery in Green Water Flooding The core is flooded with saline water containing 163053.34 ppm of total dissolved salts at reservoir temperature 90° C.

A is the cross section of the area of the core open to flow=11.664 cm$^2$

L is the length of the core=7.181 cm

The Bulk Volume BV is calculated by multiplying A and L $$BV = A \times L$$

$$BV = 11.664 \times 7.181 = 83.76 \text{ cm}^3$$

The pore volume PV is defined as volume of the water inside the core. The pore volume is calculated following the equation below:

PV=(weight of the core saturated with water−weight of the core when core is dry)/density of the water $$PV = (186.86 - 168.36)/1.1155 = 16.584 \text{ cm}^3.$$

The porosity Φ is therefore defined as a percentage of the pore volume with respect to the bulk volume of the core. The percentage porosity Φ is calculated as follows:

$$\Phi = (PV/BV) \times 100$$

$$(16.584/83.76) \times 100 = 19.80\%$$

The core that was saturated with water is then flooded with oil. The volume of water inside the core is 16.584 cm$^3$. After flooding the oil, the volume of water displaced was 10.20 cm$^3$.

The recovery water or remaining oil in the core is: 16.584 cm$^3$−10.20 cm$^3$=6.38 cm$^3$.

The percentage of the pore volume (PV) (or the initial water saturation Swi) is then calculated according to the following equation:

$$Swi = (\text{remaining water in the core/volume of water inside the core}) =$$
$$(6.38/16.584) * 100\% = 38.50\%$$

Secondary flooding with water containing 163053.34 ppm total dissolved salts. The volume of oil out is 8.60 cm$^3$.

The volume of oil in place is 10.20−8.60=1.60 cm$^3$.

The percentage of residual oil Sor is then (1.60/10.20)×100=15.69%

Tertiary flooding with green water of salinity 163053.34 ppm: The flooding is at reservoir temperature 90° C.

The oil coming out after flooding with green water is 0.6 cm$^3$.

The volume of oil in place is 1.60−0.6=1 cm$^3$.

The percentage of residual Oil Sor is (1/10.2)*100%=9.80%.

The recovery factor RF is 1−0.098=0.9.

The results of this experiment are summarized in Sheet No. 3.

| Sheet 3: Green water tertiary flooding at reservoir temperature 90 C. and salinity 163,053.34 ppm | | | | | | | | | |
|---|---|---|---|---|---|---|---|---|---|
| Brine concentration, ppm: | | 163,053.34 | | | | | | | |
| Brine specific Gravity, gm/cc: | | 1.1155 | | | | | | | |
| SAMPLE NO | L cm | D cm | DRY WT gm | SAT WT gm | Kw md | A cm2 | BV cc | PV cc | f (%) |
| 45 oil flood | 7.181 | 3.853 | 168.36 Wt. before test, gm Wt. after test, gm Volume of water out, cc Swi, % pv | 186.86 186.86 186.07 10.20 38.50 | 14.700 URD flood | 11.664 | 83.762 Volume of oil out, cc Volume of oil in place, cc Sor, % | 16.584 8.60 1.60 15.69 | 19.80 |
| Green water flood | | | Volume of oil out, cc | 0.60 | Viscosity (cp) | K (md) | Average (md) | | |
| | | | Volume of oil in place, cc Sor, % | 1.00 9.80 | 4.16 4.16 | 15.05 14.75 | 14.90 | | |
| | | | Press. (psi) | Vol. (cc) | Time (sec) | Viscosity (cp) | K (md) | Average (md) | |
| Ko@Swi | | | 200 200 | 4.80 4.70 | 60 60 | 1.62 1.62 | 2.00 1.99 | 2.00 | |
| URD flooding | | | Press. (psi) | Vol. (cc) | Time (sec) | Viscosity (cp) | K (md) | Average (md) | |
| Kw@Sor | | | 245 245 | 2.00 2.00 | 60 60 | | | | |
| Green water flood | | | Press. (psi) | Vol. (cc) | Time (sec) | | | | |
| Kw@Sor | | | 255 255 | 0.60 0.61 | 60 60 | | | | |

It can be noticed that in the previous experiment the oil recovery was 68% when the salinity of the green water was 83000 ppm. When the salinity is increased from 83000 ppm to 163053.34 ppm, the oil recovery reached 90%. This result shows clearly the efficiency of using green water in reservoirs that are at high salinity.

Experiment 4: Tertiary Flooding

The core used in this experiment is a real core cut from a real reservoir rock. This core is flooded with a real water injection from Um Rudhuma Oil field. The salinity of the water is very high (170000 ppm). The flooding is at reservoir temperature 90° C.

A is the cross section of the area of the core open to flow=11.435 cm$^2$

L is the length of the core=5.22 cm

The Bulk Volume BV is calculated by multiplying A and L $BV = A \times L$ $BV = 11.435 \times 5.22 = 59.693$ cm$^3$ The pore volume PV is defined as volume of the water inside the core. The pore volume is calculated following the equation below:

PV=(weight of the core saturated with water−weight of the core when core is dry)/density of the water PV=(144.89−134.45)/1.1155=9.359 cm$^3$.

The porosity Φ is therefore defined as a percentage of the pore volume with respect to the bulk volume of the core. The percentage porosity Φ is calculated as follows:

Φ=(PV/BV)×100

(9.359/59.693)×100=15.68%

The core being saturated with water is then flooded oil. The volume of water inside the core is 9.359 cm$^3$. After flooding with oil, the volume of water out is 6.40 cm$^3$.

The remaining water inside the core is 9.359−6.40=2.96 cm$^3$.

The percentage of pore volume (or the initial water saturation) Swi is then calculated according to the following equation:

$$Swi = (\text{remaining water in the core}/\text{volume of water inside the core}) * 100\% = (2.96/9.359) \times 100 = 31.62\%$$

Secondary flooding with water containing 170000 ppm total dissolved salts.

The volume of oil out was 4.23 cm$^3$.

The volume of oil in place 6.40−4.23=2.17 cm$^3$.

The percentage of residual oil Sor is then (2.17/6.4)×100=33.91%

Tertiary flooding with green water of salinity 170000 ppm. The flooding is at reservoir temperature of 90° C.

The oil coming out after flooding with green water was 2.17 cm$^3$.

The volume of water in place is 2.17−1.95=0.22 cm$^3$.

The percent of residual Oil Sor is (0.22/6.40)×100%=3.44%.

The recovery factor RF is 1−0.034=0.965.

96.5% Oil recovery was achieved by the green water at high salinity (170000 ppm) at 90° C.

The results of this experiment are summarized in Sheet No. 4.

Sheet 4: Green water tertiary flooding at reservoir temperature 90 C.: Ingecting real brine water from Um Rudhi 170,000.00

| Brine concentration, ppm: | 170,000.00 | | | | | | | | |
|---|---|---|---|---|---|---|---|---|---|
| Brine specific Gravity, gm/cc: | 1.1155 | | | | | | | | |
| SAMPLE NO | L cm | D cm | DRY WT gm | SAT WT gm | Kw md | A cm2 | BV cc | PV cc | f (%) |
| 375 | 5.220 | 3.815 | 134.45 | 144.89 | 9.250 | 11.435 | 59.693 | 9.359 | 15.68 |
| oil flood | | | Wt. before test, gm | 144.89 | | URD flood | Volume of oil out, cc | | 4.23 |
| | | | Wt. after test, gm | | | | Volume of oil in place, cc | | 2.17 |
| | | | Volume of water out, cc | 6.40 | | | Sor, % | | 33.91 |
| | | | Swi, % pv | 31.62 | | | Extracted Oil % | | 66.09 |
| Green water flood | | | Volume of oil out, cc | 1.95 | | | | | |
| | | | Volume of oil in place, cc | 0.22 | | | | | |
| | | | Sor, % | 3.44 | | | | | |
| | | | Extracted Oil % | 96.56 | | | | | |

| | Press. (psi) | Vol. (cc) | Time (sec) | Viscosity (cp) | K (md) | Average (md) |
|---|---|---|---|---|---|---|
| Ko@Swi | 80 | 1.00 | 140 | 4.10 | 2.46 | 2.45 |
| | 80 | 1.00 | 141 | 4.10 | 2.44 | |
| URD flooding | Press. (psi) | Vol. (cc) | Time (sec) | Viscosity (cp) | K (md) | Average (md) |
| Kw@Sor | 60 | 1.00 | 60 | 1.04 | 1.94 | 1.95 |
| | 60 | 1.00 | 59 | 1.04 | 1.97 | |
| Green water flood | Press. (psi) | Vol. (cc) | Time (sec) | Viscosity (cp) | K (md) | Average (md) |
| Kw@Sor | 548 | 0.20 | 60 | 1.04 | 0.04 | 0.04 |
| | 548 | 0.20 | 61 | 1.04 | 0.04 | |

In the previous experiment the oil recovery was 90% when synthetic water of salinity 163053.34 ppm was used. In this experiment, when Um Rudhuma water (salinity 170000) is injected into the real core the oil recovery in the tertiary phase reached 95.4%. This rise is due to the increase of the salinity from 163056 to 172000 ppm.

Experiment 5: Tar Sand Oil Recovery

Tar sand sample was made in the laboratory. A marlstone rock is collected from the United Arab Emirates soil. The rock is ground into powder. 40 grams of this powder is mixed with 20 grams of sand. The mud is prepared by adding 20 mL of heavy oil to the mixture marlstone and sand. The sample was flooded to extract the oil. The experiment is conducted as follows:

Sand Pack Sample Composition:
 a. Wight of marl powder: 40.0 g
 b. Wight of sand: 20.0 g
 c. Volume of oil: 20.0 mL
Water Composition:
 a. Volume of Zizyphus Spina Christi extract: 800.0 mL
 b. Volume of Aloe Vera Extract: 200.0 mL
 c. Concentration of sodium chloride: 5.0 g/L
Results of Primary Flooding:
 a. Brine used: sodium chloride solution at 5.0 g/L.
 b. Injecting flow rate: 1 mL/min
 c. Volume of brine injected: 100.0 mL
 d. Volume of oil produced: 12.0 mL
 e. Oil recovery percentage: 60%
 f. Volume residual oil: 8.0 mL
Results of Secondary Flooding:
 a. Brine used: a mixture of 80% by volume of Zizyphus Spina Christi and 20% by volume of
Aloe Vera together with sodium chloride
at a concentration of 5.0 g/L.
 b. Injecting flow rate: 1 mL/min
 c. Volume of brine injected: 100.0 mL
 d. Volume of oil produced: 5.3 mL
 e. Total volume of oil produced: 17.3 mL
 f. Total oil recovery percentage: 60%
 g. Enhancement of oil recovery: 26.5%
 h. Volume residual oil: 2.7 mL.
Summary of Results The results presented in Sheet 1 shows that the agent works well in secondary flooding. A recovery of 77.31% at a salinity of 86000 ppm and at reservoir temperature 90° C. was obtained.

The results presented in Sheet 2 shows that the agent works in tertiary flooding. A recovery of 66.74% at a salinity of 86000 ppm and at reservoir temperature of 90° C. was obtained.

The results presented in Sheet 3 shows that the agent works very well in tertiary flooding. A recovery of 90.20% at a very high salinity of 163053 ppm and at reservoir temperature of 90° C. was obtained.

The results presented in Sheet 4 are obtained using real core. The water is a real brine injection water from Um Rudhuma oil field and the core is from a real reservoir. The recovery is very high. 96.56% of oil recovery using the novel green composition of the present invention has unexpectedly and drastically improved the oil recovery to its maximum. This very high oil recovery has never been obtained up to date even when high technologies in the field of oil and gas are used.

For tar sand, the oil recovery was 60%.

What is claimed is:

1. A method comprising:
 generating an aqueous extract with a ratio of 80% by volume of Ziziphus Spina Christi and 20% by volume of Aloe Vera and a salinity of 86,000 ppm;
 inserting the aqueous extract into an oil reservoir; and
 recovering, with the aqueous extract, 77.3% of oil trapped in the oil reservoir having a salinity of more than 86,000 ppm.

2. The method of claim 1, wherein the aqueous extract reduces an amount of water inserted in the oil reservoir.

3. The method of claim 1, further comprising:
 reducing, with the aqueous extract, interfacial tension between the oil and water inserted in the oil reservoir.

4. The method of claim 1, wherein generating the aqueous comprises at least:
 one of:
  fructose,
  sucrose,
  maltose,
  lipids, and
  saponins.

5. The method of claim 1, further comprising:
 inserting water into the oil reservoir, as part of a secondary flooding into the oil reservoir, wherein the water has a pH level that is equal to a pH level of the aqueous extract.

6. A method comprising:
 generating an aqueous extract with a ratio of 80% by volume of Ziziphus Spina Christi plant and 20% by volume of an aqueous extract of Aloe Vera plant;
 wherein the aqueous extract has a salinity of more than 86,000 ppm, and
 wherein the aqueous extract includes at least one of:
  fructose
  sucrose,
  maltose,
  lipids, and
  saponins;
 inserting the aqueous extract into an oil reservoir at a particular pH level and at a particular temperature; and
 recovering, with the aqueous extract, 77.3% of oil trapped in the oil
 reservoir having a salinity of more than 86,000 ppm.

7. The method of claim 6, wherein the particular temperature is 90 degrees Celsius.

8. The method of claim 6, wherein the recovering the oil trapped in the oil reservoir occurs as part of secondary flooding of the oil reservoir.

9. A method comprising:
 generating an aqueous extract with a ratio of 80% by volume of Ziziphus Spina Christi and 20% by volume of Aloe Vera,
 wherein the aqueous extract includes at least one of:
  fructose
  sucrose,
  maltose,
  lipids, and
  saponins, and
 wherein the aqueous extract has a salinity of more than 163,053 ppm;
 inserting the aqueous extract into an oil reservoir at a particular pH level and at a particular temperature; and
 recovering, with the aqueous extract, 90.2% of oil trapped in the oil
 reservoir having a salinity of more than 163,053 ppm.

* * * * *